United States Patent [19]

Marks et al.

[11] Patent Number: 5,111,921
[45] Date of Patent: May 12, 1992

[54] PARK BRAKE SENSOR AND TRANSMISSION OVERRIDE

[75] Inventors: Jeffrey C. Marks; Jon R. Delaney, both of Waterloo, Iowa

[73] Assignee: Deere & Company, Moline, Ill.

[21] Appl. No.: 615,951

[22] Filed: Nov. 20, 1990

[51] Int. Cl.$^5$ ............................................. B60K 41/26
[52] U.S. Cl. .................................... 192/4 A; 180/271
[58] Field of Search ..................... 192/4 A; 74/878; 180/271

[56] References Cited

U.S. PATENT DOCUMENTS

| | | | |
|---|---|---|---|
| 3,498,194 | 9/1969 | Horsch et al. | 192/87.13 X |
| 3,565,220 | 2/1971 | Lammers et al. | 192/4 A |
| 3,854,559 | 12/1974 | Talak et al. | 192/4 A |
| 3,863,523 | 2/1975 | Starling et al. | 192/4 A X |
| 3,912,056 | 10/1975 | Neal | 74/483 R X |
| 3,978,946 | 9/1976 | Ream | 192/4 A |
| 3,998,111 | 12/1976 | Blake | 192/4 A X |
| 4,227,598 | 10/1980 | Luft | 192/4 A |
| 4,396,099 | 8/1983 | Shirley | 192/3.57 |

Primary Examiner—Rodney H. Bonck

[57] ABSTRACT

A park brake sensor valve is added to a circuit having an engagement override valve (EOV). The EOV normally prevents engagement of the transmission any time a vehicle is started with the speed selector in any position other than neutral. The park brake selector valve causes the EOV to disengage the transmission anytime the park brake is activated.

7 Claims, 1 Drawing Sheet

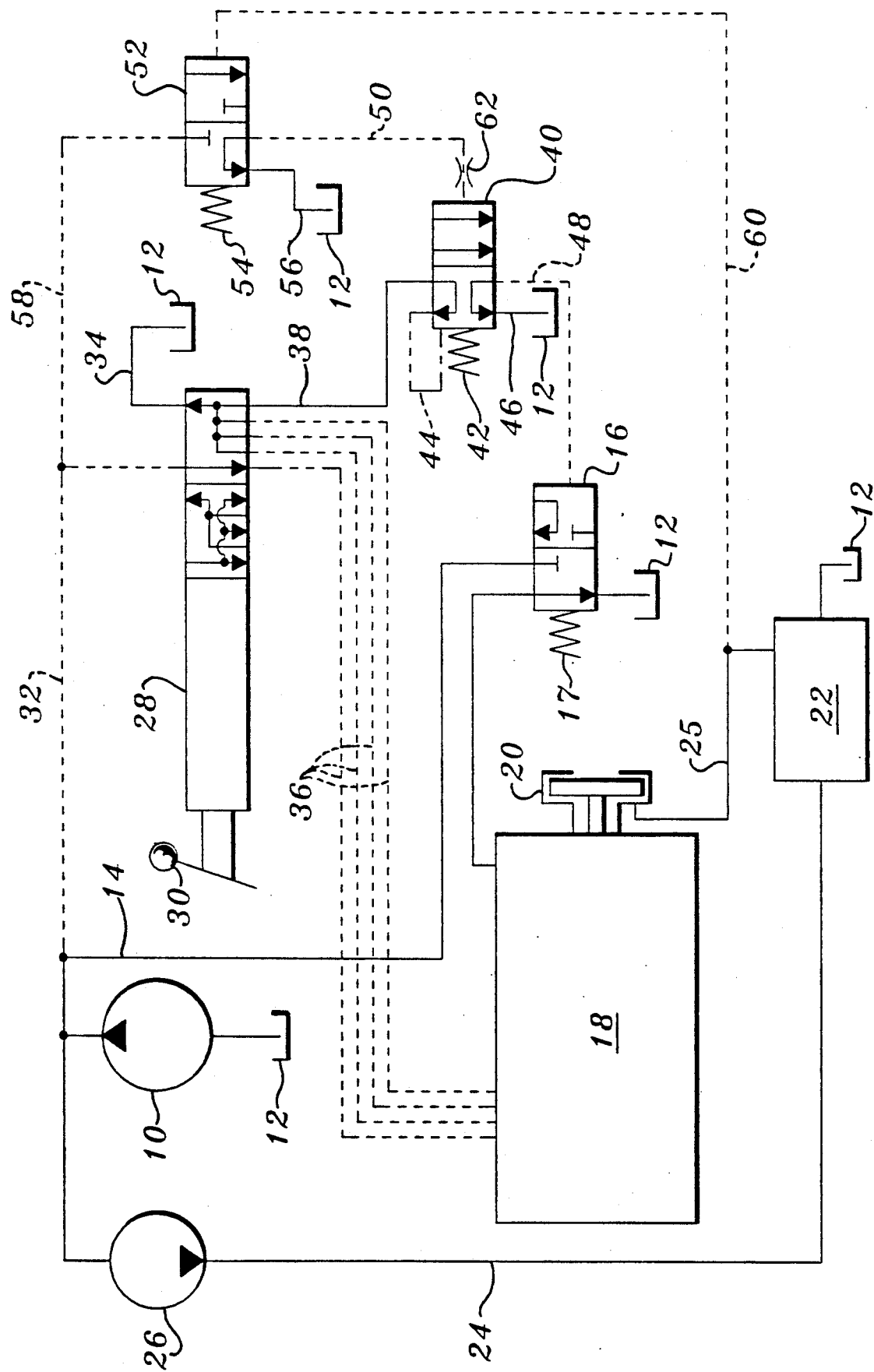

PARK BRAKE SENSOR AND TRANSMISSION OVERRIDE

BACKGROUND OF THE INVENTION

1. Field of the Invention

The present relates to transmission controls, and, in particular, controls for overriding an operator-selected transmission position.

2. Description of the Related Art

It is well known to control the engagement of a transmission in a vehicle hydraulically. This is particularly common in work vehicles, e.g., agricultural, forestry and industrial equipment, where the vehicle has numerous other hydraulically operated features.

In such a system, the gear shift lever moved by the vehicle operator changes the position of a hydraulic valve. The valve then regulates the hydraulic fluid connections to the activating valves in the transmission.

It is theoretically possible for an operator using such a system to turn the vehicle off with the selector in a gear. This means that when the vehicle is subsequently reactivated, it may lurch forward unexpectedly. Accordingly, it has been known for some time to include some form of engagement override valve, or EOV. The EOV overrides the transmission selection to prevent power from flowing to the drive shaft of the vehicle when the vehicle is started in any position other than neutral. An example of such a system is shown in U.S. Pat. No. 4,396,099 (Shirley).

It also is well known to provide a parking brake for a vehicle to hold it in position after the power is shut off. On work vehicles, such brakes frequently are spring-activated and hydraulically deactivated. This means that whenever the vehicle power is turned off or otherwise fails, the hydraulic pressure fails, and the parking brake is activated.

This default activation mode has the disadvantage that an operator may not realize the parking brake is on when he restarts the vehicle. Particularly in low gears, the vehicle may be able to drive through the parking brake. This can completely destroy the parking brake, and may result in damage to the transmission.

SUMMARY OF THE INVENTION

Accordingly, it is an object of the present invention to prevent the operator from driving through the parking brake. This object is achieved according to the present invention by providing a park brake sensor valve which detects whether the park brake is activated, and causes the engagement override valve (EOV) to disengage power to the drive shaft whenever the park brake is activated.

This structure has the advantage that it requires only a very minor modification to circuits which already have an EOV. In particular, a simple, spring-biased, two-position valve, piloted off of the pressure line which deactivates the brake, can be used to provide a pilot pressure to the EOV.

BRIEF DESCRIPTION OF THE DRAWING

The present invention will be described in greater detail with reference to the single FIGURE, which is a schematic of a possible circuit according to the present invention.

DETAILED DESCRIPTION OF THE PREFERRED EMBODIMENT

The circuit shown in the single FIGURE includes a low pressure pump 10 drawing working fluid, e.g., hydraulic oil, from a sump 12 through its inlet. The outlet of the low pressure pump 10 provides fluid at a low pressure level, e.g., about 175 psi, to a line 14. Line 14 connects via interrupter valve 16 with the operating elements in the transmission 18. Interrupter valve 16 is biased to the position shown by a spring 17.

The transmission 18 is provided with a spring-activated, hydraulically deactivated park brake 20. The park brake 20 is operated by the park brake controls 22, which are provided with pressurized fluid to operate the brake from line 14 via line 24. Depending on the operating pressures required for the park brake 20, a secondary high pressure pump 26 may be provided in line 24 to provide higher oil pressure, e.g., on the order of 500 psi, to operate the park brake 20. While the high pressure pump 26 is shown in the schematic as drawing oil from the low pressure line 14, it will be readily apparent to one of ordinary skill in the art that it could draw directly from sump 12, if desired. Park brake controls 22 activate or deactivate the park brake 20 by adjusting the pressure in line 25.

The park brake controls 22 also are connected to sump 12. The sump 12 is shown at a number of sites in the drawing for clarity of illustration. It will be understood that only a single real sump 12 normally would be provided in an actual circuit.

A speed selector valve 28 has as many positions as there are gear settings to be selected in the transmission 18. For clarity of illustration, only neutral and one other position are shown in the schematic. The position of the speed selector is controlled by the operator through a speed selector lever 30. The speed selector valve 28 is shown in its neutral position in the drawing.

One side of the speed selector valve 28 is connected to a low pressure line 32 (which is connected to low pressure line 14), and to a sump line 34 (which is connected to sump 12). The other side of the speed selector valve 28 has four lines 36 which serve as pilot-control lines for the operating valves (not shown) in the transmission 18. It will be understood that the actual number of pilot control lines 36 will depend on the number of valves to be controlled in transmission 18 and the illustration of four such lines in the schematic is not to be taken as limiting.

An engagement override valve line 38 also connects to the same side of speed selector valve 28 as pilot lines 36. The other end of line 38 connects to the engagement override valve (EOV) 40. The EOV 40 is spring-biased to the position shown in the drawings by EOV spring 42. A first EOV pilot line 44 connects to the same side of the EOV 40 as line 38, and pilots the end of EOV 40 against which EOV spring 42 presses. The other side of EOV 40 is connected by line 46 to sump 12, and by interrupter pilot line 48 to pilot the end of interrupter valve 16 opposite from interrupter valve spring 17.

The end of EOV 40 opposite from the EOV spring 42 is piloted by line 50 from the park brake sensor valve 52. The park brake sensor valve 52 is biased to the position shown by a spring 54. Line 56 connects the sump 12 to the same side of the park brake sensor valve 52 as the line 50. The other side of the park brake sensor valve 52 is connected by line 58 to low pressure lines 14, 32. The end of park brake sensor valve 52 opposite from spring 54 is piloted via line 60 off of the pressure in the park brake activation line 25. Finally, a flow limiting orifice 62 preferably is provided on line 50 to regulate the flow rate in that line.

OPERATION

With the system turned off, i.e., with pumps 10, 26 providing no pressurized fluid, interrupter valve 16, EOV 40 and park brake sensor valve 52 will all be in the positions shown in the FIGURE. Pilot lines 36 control the positions of the transmission activation valves, but the actual operating fluid for the valves comes through line 14. With the interrupter valve 16 in the position shown, no pressurized fluid is allowed to flow through line 14 to the transmission 18, so that the transmission 15 cannot engage.

When the system is first turned on, pressure will be provided to the speed selector valve 28 by line 32. As is shown in the FIGURE, in any position of the speed selector valve 28 other than neutral, line 32 should be connected to line 38 so that line 38 is pressurized. Line 50, on the other side of the EOV 40, may or may not be pressurized, depending on the position of the park brake sensor valve 52. However, on start up the pressure in line 50 will be at most equal to the pressure in line 44, so that the spring 42 will ensure that EOV 40 will remain in the position shown in the FIGURE.

EOV 40 will move out of the position shown in the FIGURE only if the gear selector 28 is first moved into neutral. In that position, line 38, and hence line 44, is drained to sump 12 through line 34. Whether EOV 40 shifts to its open position then will depend on the pressure in line 50. The pressure in line 50 in turn depends upon the position of the park brake sensor valve 52.

If the park brake 20 is activated, park brake line 25, and consequently pilot line 60, will be drained to sump 12 through the park brake controls 22. Spring 54 on the park brake sensor valve 52 then will bias the park brake sensor valve 52 into the position shown in the figure. Line 50 will be drained to sump 12 and the spring 42 will bias the EOV 40 to the position shown in the figure. Line 48 will be drained to sump 12, leaving the interrupter valve 16 in the position shown, preventing engagement of the transmission 18.

If the park brake 20 is deactivated, the pressure in lines 25, 60, will increase to an amount sufficient to overcome the force of the spring 54, and will shift the park brake sensor valve 52 to its other position. Pressure from line 58 then will be provided to line 50. Assuming the shift selector valve 28 is in neutral, so that line 44 is drained to sump, this will move the EOV 40 to its other position. In this position, pressure will be provided from line 32 through speed selector valve 28 and line 38 to line 48. This will shift the interrupter 16 to its alternate position, allowing fluid to flow to engage the transmission 18.

As will be apparent, any time pressure drops in park brake control line 25, i.e., any time the park brake 20 is activated, pressure will drop in line 60, and the park brake sensor valve will shift to the position shown in the drawing. This will reduce the pressure in line 50, shifting the EOV 40 to the position shown in the figure. This in turn will reduce the pressure in line 48, shifting interrupter valve 16 to shift to the position shown in the figure, and disengaging the transmission 18. The transmission 18 then can be reengaged only by shifting the shift selector valve 28 to neutral and deactivating the park brake 20.

A normal structure for a transmission system, without a park brake sensor valve as described, would simply connect line 58 to line 50. Thus, it is apparent that the addition of the park brake sensor valve 52 requires a very minor modification to the circuit, namely, adding a simple spool valve and its appropriate connections.

It will be readily apparent to one of ordinary skill in the art that numerous modifications could be made to the present invention. The present circuit is exemplary, and is not intended to cover all situations. A similar park brake sensor valve could be employed with almost any system previously employing an EOV, regardless of the overall circuit structure. Similarly, while the present circuit uses the combination of an EOV and an interrupter valve to act as a relay, a sufficiently large EOV could itself perform the interrupter function.

While the invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A transmission override circuit for selectively switching a transmission to neutral, wherein the position of the transmission is controlled by pressure in at least one control line and said transmission is provided with a selectively actuable park brake, the circuit comprising:
   a. a sump containing a supply of working fluid;
   b. at least one pump having an inlet drawing fluid from said sump and an outlet providing pressurized fluid;
   c. speed selector means for controlling the flow of pressurized fluid from said pump outlet to the at least one control line of the transmission, said speed selector means having a neutral position for placing the transmission in neutral and at least one other position for placing the transmission in gear;
   d. engagement override valve means for selectively overriding said speed selector means to place the transmission in neutral whenever said pump is started with said speed selector means not in its neutral position;
   e. an engagement override valve control line the pressure in which controls said engagement override valve means; and
   f. park brake sensor valve means for sensing whether said park brake is engaged and activating said engagement override valve means to override the speed selector means whenever said park brake is engaged, said park brake sensor valve means connecting said engagement override valve control line to sump when said park brake is activated and to the outlet of said at least one pump when said park brake is deactivated.

2. The transmission override circuit of claim 1, wherein operating fluid to engage said transmission is carried through a different line than said at least one control line, and further comprising interrupter valve means for selectively interrupting the flow of operating fluid to said transmission to prevent engagement of said transmission, said engagement override valve means controlling the position of said interrupter valve means.

3. The transmission override circuit of claim 1, wherein said park brake is spring-activated and hydraulically deactivated by pressure in a park brake control line, and wherein said park brake sensor valve means detects whether said park brake is engaged by sensing the pressure in said park brake control line.

4. The transmission override circuit of claim 3, wherein said park brake sensor valve means comprises a spring-biased two-position spool valve, with the end of the valve opposite from the spring piloted off of the pressure in said park brake control line.

5. The transmission override circuit of claim 4, wherein said engagement override valve means comprises a spring-biased two-position spool valve, with the end of the valve opposite from the spring piloted by the pressure in said engagement override valve control line, which in turn is controlled by said park brake sensor valve means.

6. A transmission override circuit for selectively switching a transmission to neutral, wherein the position of the transmission is controlled by pressure in at least one control line and said transmission is provided with a selectively actuable park brake, the park brake being spring-activated and hydraulically deactivated by pressure in a park brake control line, the circuit comprising:
  a. a sump containing a supply of working fluid;
  b. at least one pump having an inlet drawing fluid from said sump and an outlet providing pressurized fluid;
  c. speed selector means for controlling the flow of pressurized fluid from said pump outlet to the at least one control line of the transmission, said speed selector means having a neutral position for placing the transmission in neutral and at least one other position for placing the transmission in gear;
  d. engagement override valve means comprising a spring-biased two-positioned spool valve for selectively overriding said speed selector means to place the transmission in neutral whenever said pump is started with said speed selector means not in its neutral position;
  e. an engagement override valve control line connected to pilot the end of said engagement override valve means opposite from its spring; and
  f. park brake sensor valve means comprising a spring-biased two-position spool valve, with the end of the valve opposite from the spring piloted off of the pressure in the park brake control line, for sensing the pressure in said park brake control line to determine whether said park brake is engaged and activating said engagement override valve means to override the speed selector means whenever said park brake is engaged, said park brake sensor valve means connecting said engagement override valve control line to sump when said park brake is activated and to the outlet of said at least one pump when said park brake is deactivated.

7. The transmission override circuit of claim 6, wherein operating fluid to engage said transmission is carried through a different line than said at least one control line, and further comprising interrupter valve means for selectively interrupting the flow of operating fluid to said transmission to prevent engagement of said transmission, said engagement override valve means controlling the position of said interrupter valve means.

* * * * *